United States Patent [19]

Tsuchiya et al.

[11] Patent Number: 5,054,145
[45] Date of Patent: Oct. 8, 1991

[54] CUSHION ARRANGEMENT

[75] Inventors: Kouji Tsuchiya, Akishima; Keiichiro Tsutsui, Musashino; Masaru Koide, Nishitama, all of Japan

[73] Assignee: Nissan Motor Company, Limited, Japan

[21] Appl. No.: 376,205

[22] Filed: Jul. 5, 1989

Related U.S. Application Data

[63] Continuation of Ser. No. 6,130, Jan. 23, 1987, abandoned.

[30] Foreign Application Priority Data

Jan. 24, 1986 [JP] Japan .................. 61-13251

[51] Int. Cl.$^5$ .............................. A47C 27/08
[52] U.S. Cl. .......................... 5/448; 5/451; 297/DIG. 3
[58] Field of Search ............... 248/562, 566; 297/DIG. 1, DIG. 3, 216; 5/481, 450, 451, 448, 434

[56] References Cited

U.S. PATENT DOCUMENTS

| 2,748,379 | 6/1956 | Rockoff | 5/450 |
|---|---|---|---|
| 3,680,912 | 8/1972 | Matsuura | 297/391 |
| 3,807,678 | 4/1974 | Karnopp et al. | 248/562 |
| 3,982,786 | 9/1976 | Burgin et al. | 297/DIG. 3 |
| 4,089,499 | 5/1978 | Ware et al. | 248/631 |
| 4,568,124 | 2/1986 | Kanai | 277/DIG. 3 |
| 4,573,740 | 3/1986 | Frobose | 297/DIG. 3 |
| 4,671,227 | 6/1987 | Hollerweger et al. | 248/566 |

FOREIGN PATENT DOCUMENTS

| 34960 | 9/1981 | European Pat. Off. | 297/DIG. 3 |
|---|---|---|---|
| 3011412 | 10/1981 | Fed. Rep. of Germany | 297/DIG. 1 |
| 55-157472 | 2/1980 | Japan . | |
| 57-100536 | 2/1982 | Japan . | |
| 60-31549 | 9/1985 | Japan . | |
| 36029 | 2/1986 | Japan | 297/DIG. 3 |
| 933495 | 6/1982 | U.S.S.R. | 297/DIG. 1 |
| 1237495 | 6/1986 | U.S.S.R. | 297/DIG. 3 |

Primary Examiner—Eric K. Nicholson
Attorney, Agent, or Firm—Leydig, Voit & Mayer

[57] ABSTRACT

A cushion arrangement includes a cushion body and a dynamic damper connected to the cushion body for damping vibration of the cushion body. The dynamic damper generally includes a mass and a resilient connection between the mass and the cushion body. The mass may include liquid. A device may offer resistance to movement of the liquid responsive to vibration of the cushion body.

1 Claim, 6 Drawing Sheets

CUSHION ARRANGEMENT

This application is a continuation of application Ser. No. 07/006,130 filed Jan. 23, 1987 now abandoned.

BACKGROUND OF THE INVENTION

1. Field of the Invention

This invention relates to a cushion arrangement for a seat, a bed, or the like. Specifically, this invention relates to a cushion arrangement for a seat, a bed, or the like in means of transportation including vehicles, vessels, and aircrafts.

2. Description of the Prior Art

Japanese published examined utility model application 60-31549 discloses a vehicle seat, the seat cushion of which defines a chamber accommodating cushioning members. This chamber is in constant communication with atmosphere via first-type slits. The chamber can communicate with atmosphere also via second-type slits. Check valves block and unblock the second-type slits to control a damping factor. During appreciable contraction of the chamber, the check valves unblock the second-type slits and reduce resistance to the escape of air from the chamber to atmosphere so that a decreased damping factor is induced. During expansion of the chamber or during small variations in volume of the chamber, the check valves block the second-type slits and increase resistance to the admission of air into the chamber so that an increased damping factor is induced.

Japanese published unexamined utility model application 57-100536 discloses a vehicle seat, the seat cushion of which defines a chamber accommodating a cushioning member. This chamber communicates with atmosphere via holes having adjustable cross-sectional areas. A damping factor depends on the cross-sectional areas of the communication holes. A sensor detects the frequency of vibration of the vehicle body relative to a vehicle axle. The cross-sectional areas of the communication holes are adjusted in accordance with the detected vibration frequency so that the damping factor varies as a function of the vibration frequency.

SUMMARY OF THE INVENTION

It is an object of this invention to provide a comfortable cushion arrangement.

It is another object of this invention to provide a cushion arrangement having excellent damping effect.

In accordance with this invention, a cushion arrangement includes a cushion body and a dynamic damper connected to the cushion body for damping vibration of the cushion body. In a first aspect of this invention, the dynamic damper includes a mass and a resilient connection between the mass and the cushion body. In a second aspect of this invention, the mass includes liquid. In a third aspect of this invention, a device offers resistance to movement of the liquid responsive to vibration of the cushion body.

DESCRIPTION OF THE FIRST PREFERRED EMBODIMENT

Figure 1:
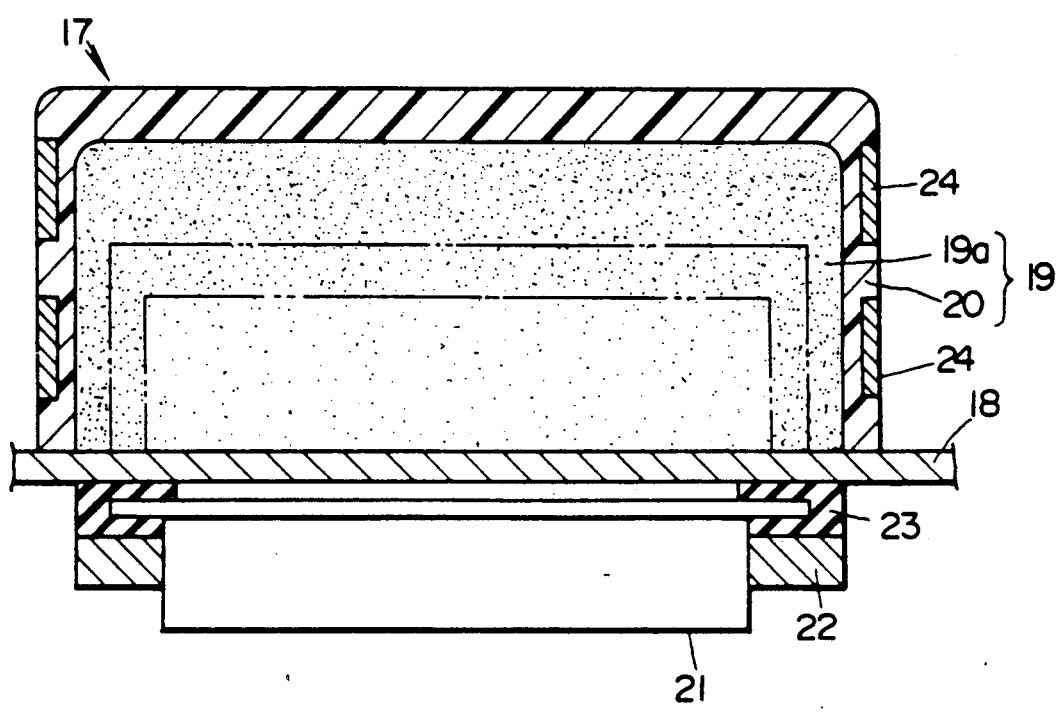
FIG. 1 is a cross-sectinal view of a seat cushion according to a first embodiment of this invention.

With reference to FIG. 1, a vehicle seat includes a seat cushion 17 having a horizontally-extending frame or base plate 18 fixed to a vehicle body. Layers 19 of resilient members attached to the base plate 18 extend above the base plate 18. The resilient layers 19 include an inner layer 19a of sponge rubber and an outer layer 20 covering the sponge rubber layer 19a. Ribs 24 embedded in the outer layer 20 maintain a shape of the seat cushion 17.

A mass or weight 21 extending below the base plate 18 is attached to the base plate 18 via a support plate 22 and a resilient support 23 made of rubber. Specifically, the resilient support 23 is sandwiched between the base plate 18 and the support plate 22. The resilient support 23 is attached to both the base plate 18 and the support plate 22 by suitable means or process, such as bolts, baking, and adhesive. The support plate 22 is resiliently connected to the base plate 18 via the resilient support 23. The weight 21 is retained by the resilient support 23 and the support plate 22. The weight 21 extends through the support plate 22. The support plate 22 contacts the weight 21 to hold the weight 21. An upper portion of the weight 21 has a flange extending into the resilient support 23. This flange is held by the resilient support 23. The weight 21 is spaced from the base plate 18. In this way, the weight 21 is resiliently connected to the base plate 18, that is, the seat cushion 17, via the resilient support 23. It should be noted that the weight 21 may be made of rigid material or elastic material.

When vibratory forces travel from the vehicle body to the base plate 18, the seat cushion 17 and the weight 21 are vibrated. Since the weight 21 is resiliently connected to the seat cushion 17, the weight 21 forms a dynamic damper absorbing or suppressing vibrations of the seat cushion 17. The dynamic damper includes the resilient support 23 which provides a resilient connection between the weight 21 and the seat cushion 17. The dynamic damper has a resonant or natural vibration frequency dependent on the mass of the weight 21 and on the spring modulus of the resilient support 23. Vibrations of the seat cushion 17 having frequencies equal to and around the resonant vibration frequency of the dynamic damper are effectively absorbed or suppressed by the dynamic damper. The mass of the weight 21 and the spring modulus of the resilient support 23 are chosen so that the resonant frequency of the dynamic damper tunes to a frequency of vibration of the seat cushion 17 required to be damped. For example, the resonant frequency of the dynamic damper is tuned to a natural frequency of the seat cushion 17.

Figure 2:
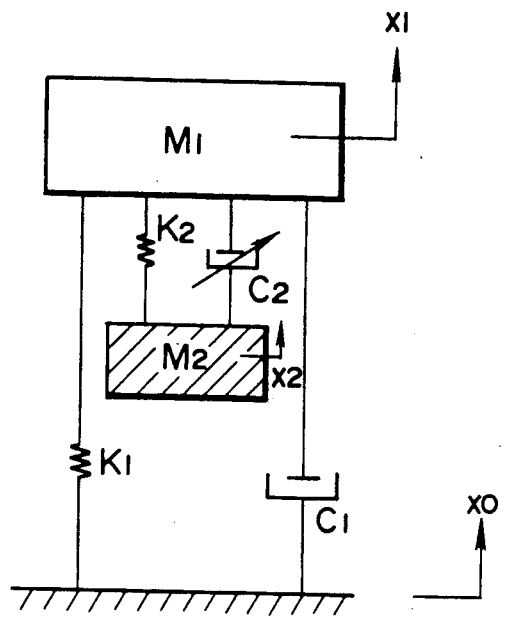
FIG. 2 is a schematic diagram of the seat cushion of FIG. 1.

FIG. 2 shows a model of the system of FIG. 1. Equations of motion of this model are given as follows.

$$M1x1 + (x1-x0)K1 + (x1-x0)C1 = M2x2 + (x1-x2)K2 + (x1-x2)C2 \quad (1)$$

$$M2x2 + (x2-x1)K2 + (x2-x1)C2 = 0 \quad (2)$$

In FIG. 2 and the equations (1) and (2); M1 denotes the vibration mass mainly composed of a vehicle passenger; M2 denotes the mass of the weight 21; K1 denotes the spring modulus of the resilient layers 19; K2 denotes the spring modulus of the resilient support 23; x0, x1, and x2 denote displacements; C1 denotes a damping factor related to the resilient layers 19; and C2 denotes a damping factor determined by the resilient support 23.

DESCRIPTION OF THE SECOND PREFERRED EMBODIMENT

Figure 3:
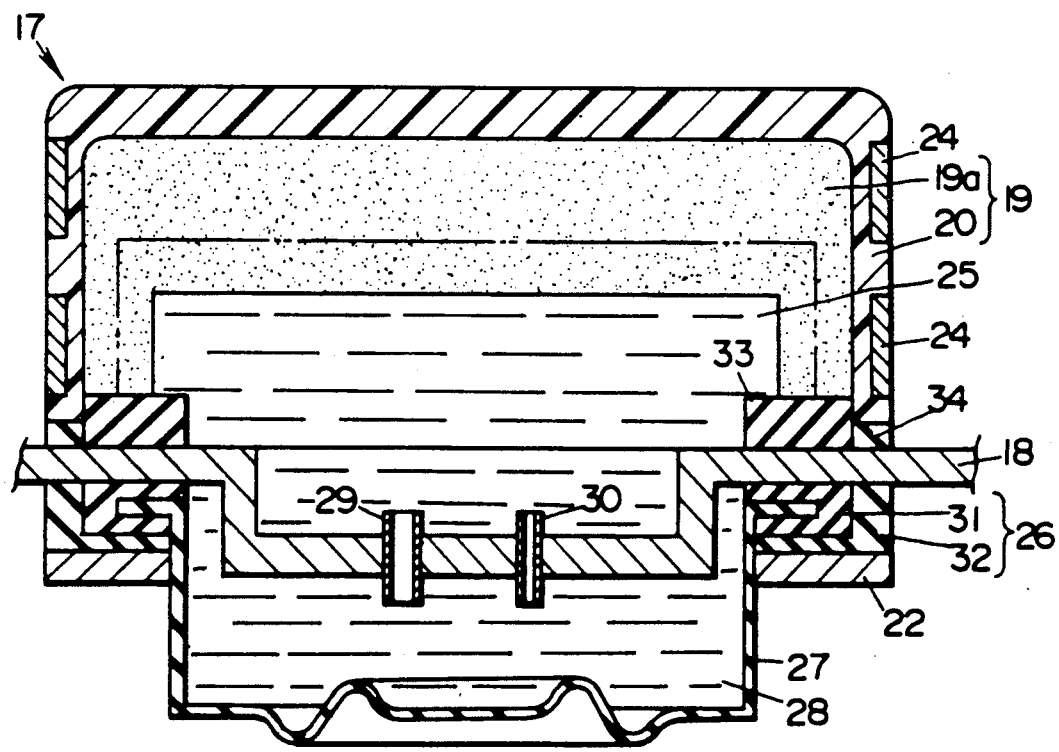
FIG. 3 is a cross-sectional view of a seat cushion according to a second embodiment of this invention.

With reference to FIG. 3, a vehicle seat includes a seat cushion 17 having a horizontally-extending frame or base plate 18 fixed to a vehicle body. Layers 19 of resilient members attached to the base plate 18 extend above the base plate 18. The resilient layers 19 include an inner layer 19a of sponge rubber and an outer layer 20 of impermeable material covering the sponge rubber layer 19a. Ribs 24 embedded in the outer layer 20 maintain a shape of the seat cushion 17. A sealing rubber 33 is provided between the sponge layer 19a and the base plate 18. A sealing rubber 34 is provided between the outer layer 20 and the base plate 18.

The sponge rubber layer 19a and the base plate 18 define a chamber 25 within the seat cushion 17. The sponge rubber layer 19a has a recess. The base plate 18 has a recess opposing the recess in the sponge rubber layer 19a. The recess in the sponge rubber layer 19a and the recess in the base plate 18 form the chamber 25. Since the outer layer 20 is made of the impermeable material and is connected to the base plate 18 via the sealing member 34, the outer layer 20 and the base plate 18 define a sealed chamber in which the sponge rubber layer 19a is disposed and in which the chamber 25 is defined. It should be noted that the sponge rubber layer 19a has pores in communication with the chamber 25.

A vertically-extending cup-shaped or cylindrical diaphragm 27 is located below the base plate 18. The cup-shaped diaphragm 27 has an open upper end and a closed lower end. The open upper end of the diaphragm 27 is resiliently and sealingly attached to the base plate 18 via a resilient support 26. The diaphragm 27 and the base plate 18 define an essentially sealed chamber 28, a major part of which is formed by a recess in the cup-shaped member 27. The resilient support 26 extends between the base plate 18 and a support plate 22. The resilient support 26 includes rubber sealing rings 31 and 32 fixed to each other. The first sealing ring 31 has a laid U-shaped cross-section and defines a groove into which a flange on the open upper end of the diaphragm 27 fits. The second sealing ring 32 has an L-shaped cross-section and defines a groove in which the first sealing ring 31 fits. The first sealing ring 31 extends between the base plate 18 and a portion of the second sealing ring 32 contacting the support plate 22. Another portion of the second sealing ring 32 extends outward of the first sealing ring 31. The second sealing ring 32 contacts both the base plate 18 and the support plate 22. The combination of the first and second sealing rings 31 and 32 is attached to the base plate 18 and the support plate 22 by suitable means or process, such as screws, baking, and adhesive.

Tubes 29 and 30 supported by the base plate 18 extend through the base plate 18. The tubes 29 and 30 define orifices via which the chambers 25 and 28 communicate. While the chambers 25 and 28 are mutually connected, the combination of the chamber 28 and the chamber between the outer layer 20 and the base plate 18 which includes the chamber 25 is sealed with respect to atmosphere. The chambers 25 and 28 are filled with liquid.

When a vehicle passenger sits on the seat cushion 17, the chamber 25 is contracted and a portion of the liquid is moved from the chamber 25 to the chamber 28 via the orifices in the tubes 29 and 30. As the liquid moves from the chamber 25 to the chamber 28, the chamber 28 expands. The volumes of the chambers 25 and 28 stop varying when the pressures within the chambers 25 and 28 become equal.

During movement of the vehicle under normal road conditions, weak vibrations or low-frequency vibrations of the vehicle body result from engine vibrations, changes of the vehicle speed, vehicle steering operations, and general unevenness of road surfaces. When such weak vibrations or low-frequency vibrations travel to the base plate 18, the inertia of the liquid in the chambers 25 and 28 and also the inertia of the passenger cause movement of the liquid relative to the base plate 18. This relative movement causes portions of the liquid to flow in the orifices of the tubes 29 and 30. The orifices are sized to offer predetermined resistances to the liquid flow, thereby damping the vibrations. In other words, vibration energy travels from the seat cushion to the liquid in the chambers 25 and 28, and is damped or dissipated through the application of the resistances to the liquid flows by the orifices in the tubes 29 and 30. The damping characteristic depends on the design of the orifices, e.g., the effective cross-sectional areas of the orifices.

When the vehicle is moving across a bump or a pothole, and when the vehicle is moving on rough roads, the vehicle body is exposed to great vibrations. When such great vibrations travel to the base plate 18, the inertia of the liquid in the chambers 25 and 28 and also the inertia of the passenger cause movement of the liquid in the chambers 25 and 28 relative to the base plate 18 so that portions of the liquid periodically move between the chambers 25 and 28 via the orifices in the tubes 29 and 30. The orifices offer resistances to the liquid movements, and thereby damping the vibrations.

In cases where the orifices in the tubes 29 and 30 are circular, each of the orifices is preferably designed on the basis of the following relationship. The ratio L/D resides in the range of approximately 2-8, where L denotes the length of the orifice and D denotes the diameter of the orifice.

The effective cross-sectional areas of the orifices through the tubes 29 and 30 are preferably different. This design increases the range of frequency of vibration in which the vibration is effectively damped.

The liquid within the chambers 25 and 28 is preferably a solution of water and ethylene glycol which enalbes easy adjustment of the boiling temperature and the freezing point. The liquid may be pure water, or liquid metal, such as hydrargyrum. In addition, the liquid may be a solution of water and salt, such as zinc iodide, ammonium iodide, or cerium nitrate. Furthermore, the liquid may be of the type containing particles, for example, magnetic fluid.

The liquid within the orifices 29 and 30 and the resilient layers 19 define a system which serves as a dynamic damper. During movement of the liquid, the speed of the liquid flow in the orifices through the tubes 29 and 30 is increased so that the apparent dynamic damper mass determined by the liquid in the orifices through the tubes 29 and 30 is also increased. The apparent dynamic damper mass depends on the weight of a passenger, and the frequency and the amplitude of a vibration transmitted from the vehicle body to the seat cushion 17. This variable characteristic of the dynamic damper mass is advantageous in damping vibrations of a wide range of frequencies.

Figure 4:
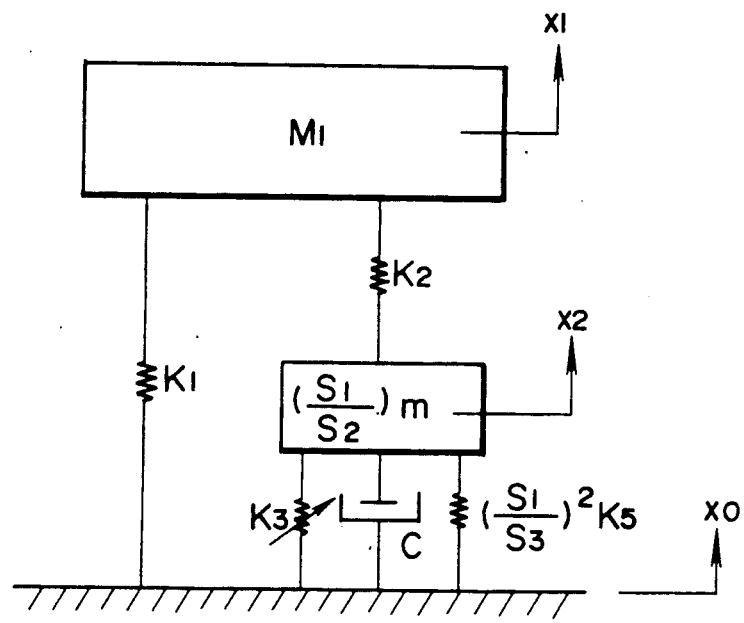
FIG. 4 is a schematic diagram of the seat cushion of FIG. 3.

FIG. 4 shows a model of the system of FIG. 3. Equations of this system are given as follows.

$$M1x1 + (x1-x0)K1 + (x1-x2)K2 = 0 \tag{3}$$

$$(s1/S2)mx + (x2-x0)K3 + (x2-x0)(SL/S3)^2K5 + (x2-x0)c + (x2-x1)K2 = 0 \tag{4}$$

In FIG. 4 and the equations (3) and (4): M1 equals M minus DM; M denotes the vibration mass mainly composed of a vehicle passenger; DM denotes a varied mass in the chamber 25 under a static load on the seat cushion 17; m denotes the apparent mass acting on the orifices in the tubes 29 and 30; K1 denotes the spring modulus of the resilient layers 19; K2 denotes the spring modulus of the resilient member of the dynamic damper; K3 denotes the spring modulus of the cushion-orifice system; K5 denotes the spring modulus of the cushion-dynamic mass system; x0, x1, and x2 denote displacements; C denotes the damping factor determined by the orifices in the tubes 29 and 30; S1 is the area of the vibration system mainly composed of a vehicle passenger which receives pressure; S2 denotes the cross-sectional area of the orifices in the tubes 29 and 30; and S3 denotes the area of the dynamic mass which receives pressure.

DESCRIPTION OF THE THIRD PREFERRED EMBODIMENT

Figure 5:
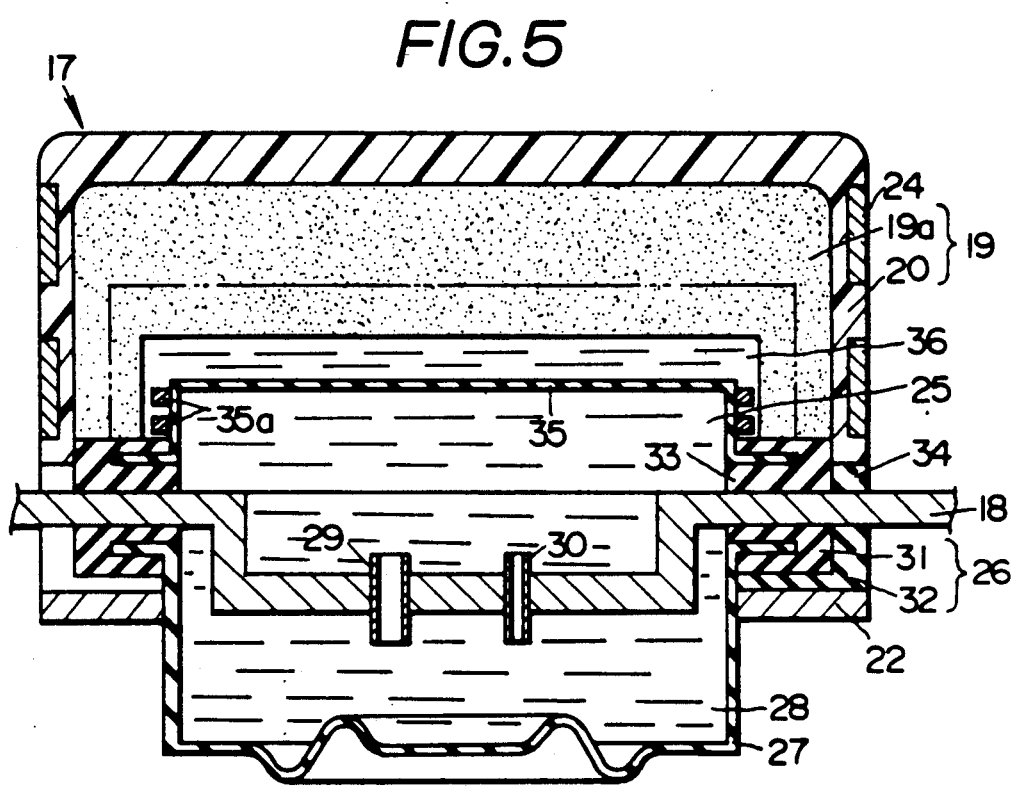
FIG. 5 is a cross-sectional view of a seat cushion according to a third embodiment of this invention.

FIG. 5 shows a third embodiment of this invention, which is designed in a manner similar to the embodiment of FIG. 3 except for the following design changes.

As shown in FIG. 5, the chamber between the outer layer 20 and the base plate 18 is divided by a fluid-tight resilient member 35 into an upper chamber 36 and a lower chamer 25. Edges of the partition member 35 are fluid-tightly retained by the sealing ring 33. Ribs 35a engaging the partition member 35 maintain a shape of the member 35. The upper chamber 36 defined between the $ outer layer 20 and the partition member 35 is sealed. The other chamber 25 communicates with the chamber 28 via the orifices in the tubes 29 and 30.

The uppermost chamber 36 is filled with a first liquid. The chambers 25 and 28 are filled with a second liquid having a specific gravity or relative density greater than that of the liquid in the chamber 36. The greater-density liquid generally increases the mass of the dynamic damper, thereby promoting the vibration-suppression effect of the dynamic damper.

When a passenger sits on the seat cushion 17, the weight of the passenger is transmitted to the liquid in the chamber 25 via the liquid in the uppermost chamber 36 so that a portion of the liquid is forced from the chamber 25 into the chamber 28 via the orifices in the tubes 29 and 30.

Under other conditions, operation of this embodiment is similar to operation of the embodiment of FIG. 3.

DESCRIPTION OF THE FOURTH PREFERRED EMBODIMENT

Figure 6:
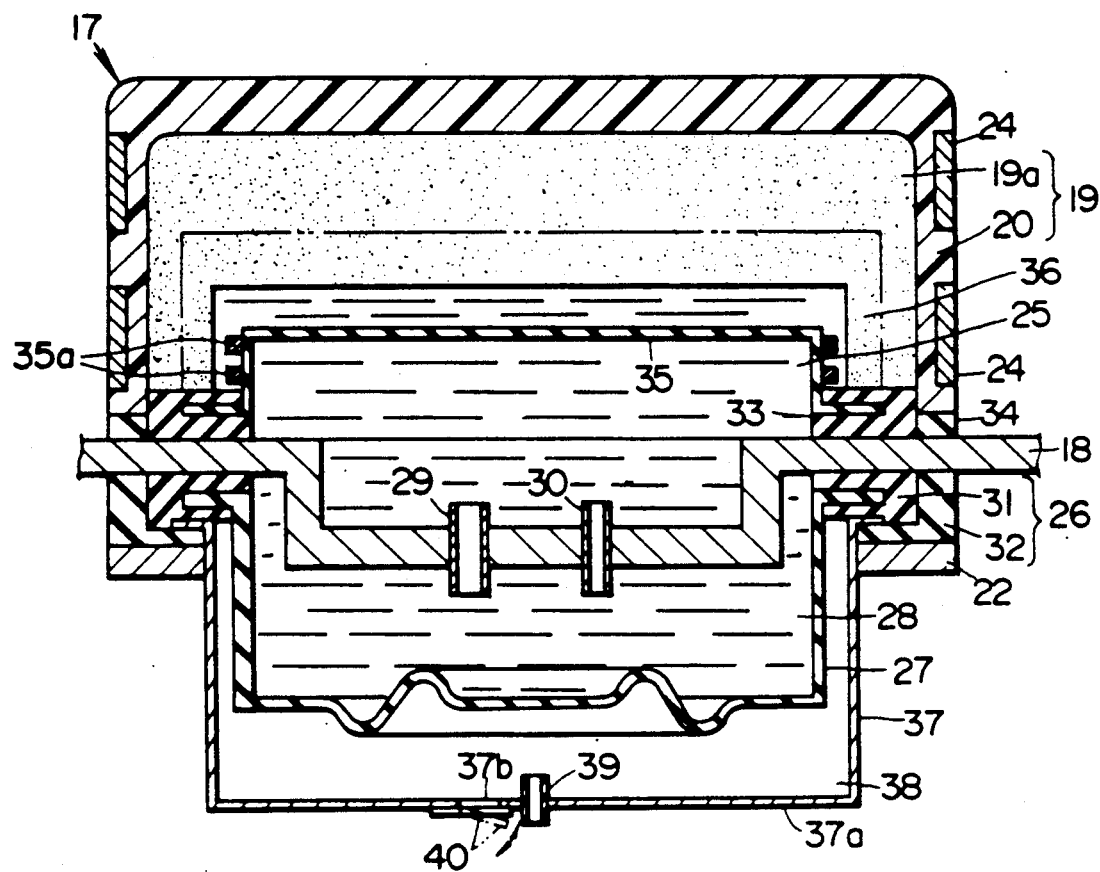
FIG. 6 is a cross-sectional view of a seat cushion according to a fourth embodiment of this invention.

FIG. 6 shows a fourth embodiment of this invention, which is designed in a manner similar to the emdodiment of FIG. 5 except for the following design changes.

As shown in FIG. 6, a vertically-extending cylindrical or cup-shaped outer shell 37 has an open upper end and a closed lower end. The outer shell 37 is attached to the base plate 18 via the resilient support 26. The open upper end of the outer shell 37 has a flange retained by the sealing rings 31 and 32. The outer shell 37 is preferably rigid. A major portion of the diaphragm 27 is coaxially disposed within the cup-shaped member 37. An air chamber 38 is defined between the diaphragm 27 and the outer shell 37.

A tube 39 supported by a closed end wall 37a of the outer shell 37 extends through the wall 37a. The tube 39 defines an orifice via which the air chamber 38 leads to atmosphere. Air can move into and out of the air chamber 38 via the orifice in the tube 39. One way reed valve includes a valve plate 40 selectively blocking and unblocking a valve opening 37b formed through the end wall 37a. When the pressure within the air chamber 38 is equal to or lower than a preset level, the valve plate 40 blocks the valve opening 37b. In this case, the air chamber 38 communicates with atmosphere only via the orifice in the tube 39. When the pressure within the air chamber 38 increases above the preset level, the valve plate 40 unblocks the opening 37b and thus the air chamber 38 communicates with atmosphere via both the orifice in the tube 39 and the valve opening 37b, thereby increasing the effective cross-sectional area of a communication path between the air chamber 38 and atmosphere.

Figure 7:
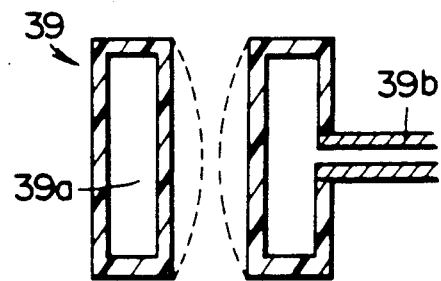
FIG. 7 is an elarged cross-section of the tube of FIG. 6.

As shown in FIG. 7, the tube 39 has cylindrical walls composed of a hollow deformable member defining an internal annular chamber 39a. The effective cross-sectional area of the orifice defined by the tube 39 varies with the pressure in the chamber 39a. A pipe 39b connects the chamber 39a to the chamer 36 so that the chamber 39a is exposed to the pressure in the chamber 36. Accordingly, the effective cross-sectional area of the orifice defined by the tube 39 varies with the pressure in the chamber 36. The pressure in the chamber 36 during its contraction differs from the pressure in the chamber 36 during its expansion, so that the effective cross-sectional area of the orifice in the tube 39 depends on whether the chamber 36 is contracting or expanding. Accordingly, a damping factor which is determined by the effective cross-sectional area of the orifice in the tube 39 depends on whether the chamber 36 is contracting or expanding.

It should be noted that the orifice in the tube 39 may have a fixed effective cross-sectional area.

When a vehicle passenger sits on the seat cushion 17, and when weak vibrations are transmitted to the base plate 18, this embodiment operates in a way essentially similar to the embodiment of FIG. 5. During these conditions, the valve plate 40 generally blocks the valve opening 37b.

The one way valve may be designed so that the valve plate 40 unblocks the valve opening 37b when a passenger sits on the seat cushion 17. The unblocking of the valve opening 37b allows easier escape of air from the chamber 38 into atmosphere and thus decreases the related damping effect or damping factor.

When the vehicle is moving across a bump or a pothole, and when the vehicle is moving on rough roads, the vehicle body is exposed to great vibrations which travel to the base plate 18, as described previously.

In general, at the start of such great vibrations, the base plate 18 and the seat cushion 17 receive an upward shock. This upward shock and the inertia of the passenger rapidly compresses the chamber 25, thereby moving the liquid from the chamber 25 into the chamber 28 at a high rate through the orifices in the tubes 29 and 30. The orifices in the tubes 29 and 30 offer resistances to the liquid movement and thereby damp the shock or vibration. The movement of the liquid into the chamber 28 rapidly expands the chamber 28 and compresses the air chamber 38. This rapid compression of the air chamber 38 increases the pressure within the chamber 38 above the preset level, thereby causing the valve plate 40 to unblock the valve opening 37b. Accordingly, during this rapid compression of the air chamber 38, air escapes from the chamber 38 into atmosphere via both the valve opening 37b and the orifice in the pipe 39 so that a resistance to the air flow from the chamer 38 to atmosphere is lowered and thus the resulting damping effect or the related damping factor is decreased.

After the rapid compression of the chamber 25, the resilience of the elastic layers 19 and the resilience of the vehicle body cause rapid expansion of the chamber 25. During this expansion of the chamber 25, the liquid moves from the chamber 28 into the chamber 25 via the orifices in the tubers 29 and 30. The orifices in the tubes 29 and 30 offer resistances to the liquid movement and thereby damp the vibration. The liquid movement out of the chamber 28 contracts the chamber 28. As the chamber 28 contracts, the air chamber 38 expands. The expansion of the air chamber 38 lowers the pressure within the chamber 38 and causes the valve plate 40 to block the valve opening 37b. Accordinly, during the expansion of the air chamber 38, air is admitted into the chamber 38 only via the orifice in the tube 39 so that the resistance to the air flow into the chamber 38 is increased and thus the resulting damping effect or the related damping factor is increased.

As is made clear from the previous description, in cases where the seat cushion 17 is exposed to great vibrations, the damping effect or the damping factor during compression of the seat cushion 17 is lower than the damping effect or the damping factor during expansion of the seat cushion 17. This damping characteristic is advantageous for the following reasons. The lowered damping effect during compression of the seat cushihon 17 reduces the direct transmission of an uncomfortable upward shock to a vehicle passenger. The increased damping effect during expansion of the cushion 17 damps the vibration quickly.

DESCRIPTION OF THE FIFTH PREFERRED EMBODIMENT

Figure 8:
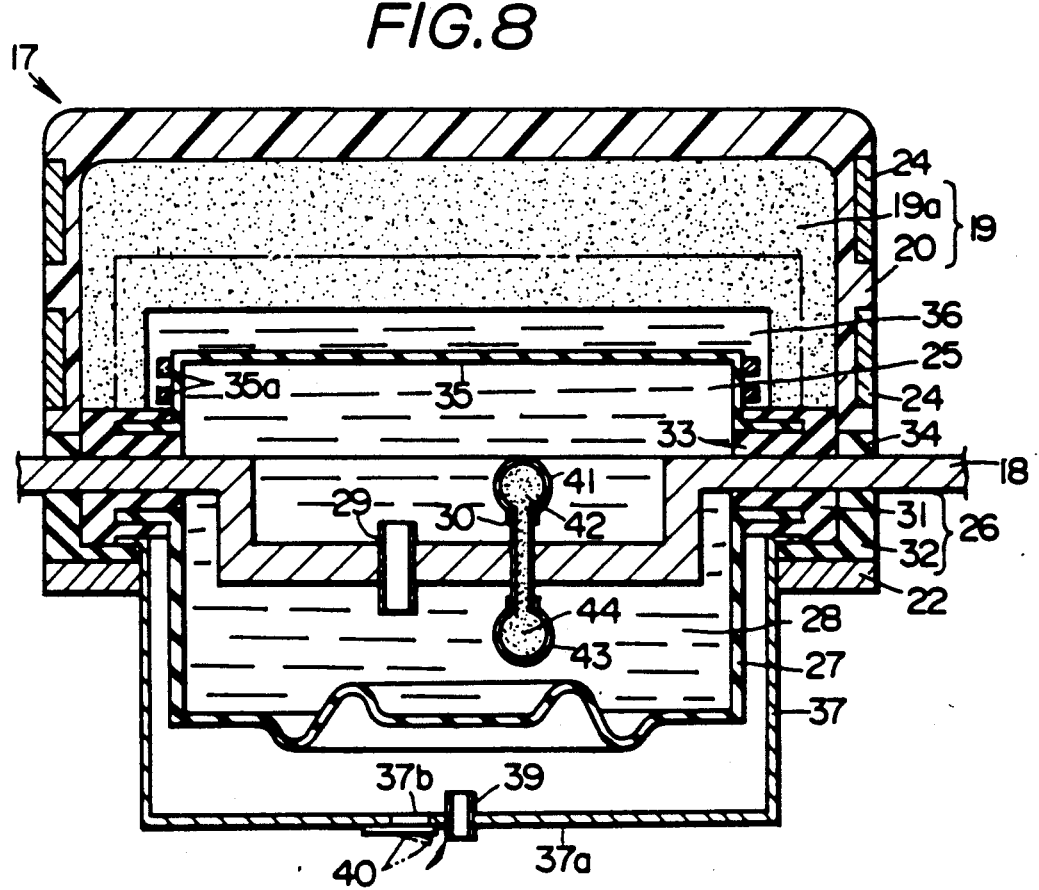
FIG. 8 is a cross-sectional view of a seat cushion according to a fifth embodiment of this invention.

FIG. 8 shows a fifth embodiment of this invention, which is designed in a manner similar to the emdodiment of FIG. 6 except for the following design changes.

As shown in FIG. 8, a spherical hollow member 41 made of fluid-tight and elastic material defines a small chamber 42 within the chamber 25. The spherical member 41 is connected to the end of the tube 30. Another spherical hollow member 43 made of fluid-tight and elastic material defines a small chamber 44 within the chamber 28. The spherical member 43 is connected to the end of the tube 30. The small chambers 42 and 44 communicate through the orifice in the tube 30. The combination of the chambers 42 and 44, and the orifice in the tube 30 is sealed. The small chambers 42 and 44 are filled with the same high density liquid as in the chambers 25 and 28. It should be noted that the small chambers 42 and 44 may be filled with liquid having a specific gravity or relative density higher than that of the liquid in the chambers 25 and 28.

The liquid within the small chambers 42 and 44 is preferably a solution of water and ethylene glycol which enalbes easy adjustment of the boiling temperature and the freezing point. The liquid may be pure water, or liquid metal, such as hydrargyrum. In addition, the liquid may be a solution of water and salt, such as zinc iodide, ammonium iodide, or cerium nitrate. Furthermore, the liquid may be of the type containing particles, for example, magnetic fluid.

When vibrations travel to the base plate 18, the inertia of the liquid in the small chambers 42 and 44 cause movement of the liquid relative to the base plate 18. During this movement of the liquid, portions of the liquid flow in the orifice of the tube 30. The orifice in the tube 30 offers resistance to the liquid flow and thereby damps the vibrations of the seat cushion 17.

The other part of this embodiment operates in way similar to the embodiment of FIG. 6.

DESCRIPTION OF THE SIXTH PREFERRED EMBODIMENT

Figure 9:
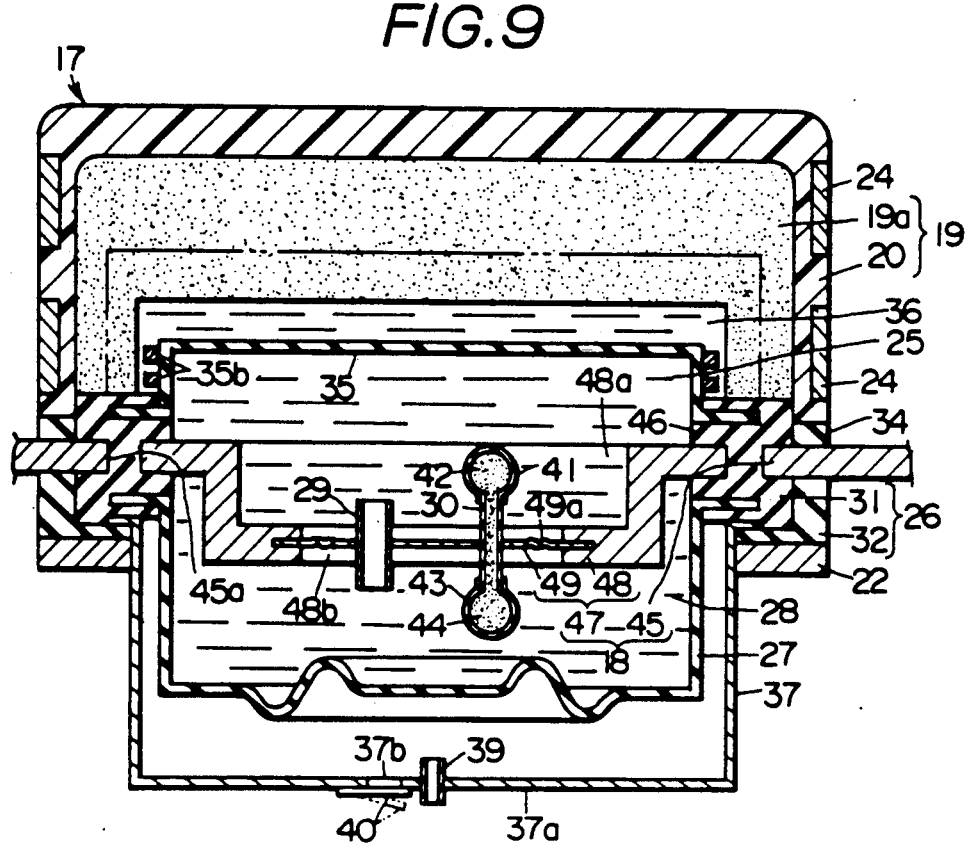
FIG. 9 is a cross-sectional view of a seat cushion according to a sixth embodiment of this invention.

FIG. 9 shows a sixth embodiment of this invention, which is designed in a manner similar to the embodiment of FIG. 8 except for the following design changes.

As shown in FIG. 9, a base plate 18 includes a fixed portion 45 and a movable portion 47. The fixed portion 45 is directly secured to the vehicle body. The movable portion 47 is connected to the first portion 45 via a resilient support member 46 so that the portion 47 can move relative to the fixed portion 45. Specifically, the portion 47 can move vertically. The movable plate 47 separates the chambers 25 and 28. The support member 46 is fluid-tight.

The outer layer 20 is connected to the fixed plate 45 via a sealing member 34. The sponge rubber layer 19a is connected to the fixed plate 45 via the resilient support member 46. The partition member 35 and the diaphragm 27 are retained by the resilient support 46. The outer shell 37 is retained by the resilient support 46 and the sealing member 32.

The movable plate 47 includes an outer portion 48 and an inner portion 49. The outer plate 48 has a recess 48a defining a part of the chamber 25. The wall of the outer plate 48 defining the bottom of the recess 48a has an opening 48b. The inner plate 49 is thin. The inner plate 49 is held by the wall of the outer plate 48 around the opening 48b. The inner plate 49 extends across the opening 48b and blocks the opening 48b. The inner plate 49 has a wave-shaped flexible section 49a extending in the opening 48b near the edge of the opening 48b. During vertical movement of the inner plate 49, the flexible section 49a deforms.

The tubes 29 and 30 extend through the inner plate 49. The tubes 29 and 30 are supported by the inner plate 49.

The natural frequency of the movable plate 47 is preferably much higher than the natural frequency of the seat cushion 17. In addition, the natural frequency of the movable plate 47 is preferably chosen in accordance with frequencies of vibrations resulting from the vehicle engine. For example, the natural frequency of the movable plate 47 is in the range of approximately 50–400 Hz, and the natural frequency of the seat cushion 17 is in the range of approximately 3–5 Hz.

Figure 10:
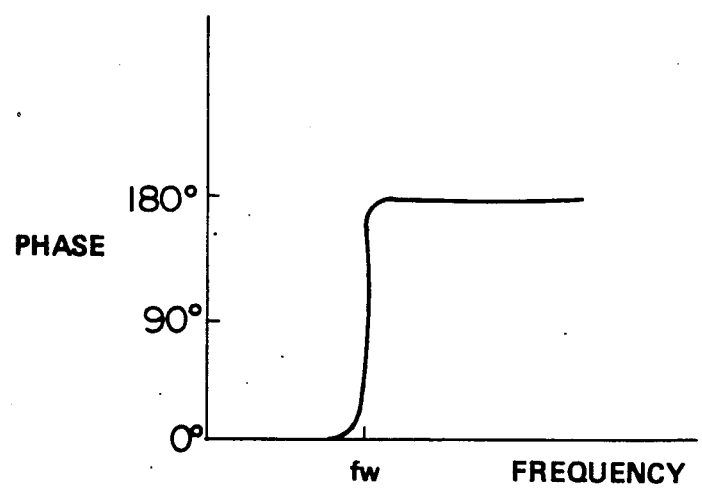
FIG. 10 is a diagram showing the relationship in phase between the vibration of the movable plate and the external vibratory force in the seat cushion of FIG. 9.

As shown in FIG. 10, in cases where external vibratory forces having varying frequencies are applied to the movable plate 47 via the fixed plate 45, the phase of forced movement of the movable plate 47 is opposite to the phase of the external vibratory force at frequencies above the natural frequency fw of the movable plate 47. The forced movement of the movable plate 47 is in phase with the exernal vibratory force at frequencies below the natural frequency fw of the movable plate 47.

Accordingly, at frequencies above the natural frequency fw of the movable plate 47, variations in volume of the chambers 25 and 28 caused by external vibratory forces are reduced or prevented. This reduction or prevention of the volume variation means absorption or damping of the vibration.

Vibrations with frequencies in the range of 3–5 Hz, and 20 Hz can be effectively damped by the resistances to the liquid flow offered by the orifices in the tubes 29 and 30. Vibrations with higher frequencies can be effectively absorbed by the action of the movable plate 47, provided that the natural frequency fw of the movable plate 47 is set to an appropriate high frequency.

Figure 11:
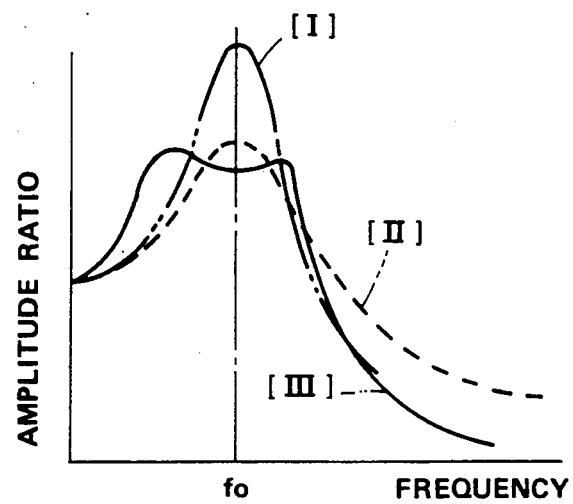
FIG. 11 is a diagram showing the relationships between the amplitude ratios and the vibration frequency.

FIG. 11 shows the relationships between the amplitude ratios and the frequency of a vibration. When the damping factor C1 (see FIG. 2 and the equation (1)) or C (see FIG. 4 and the equation (4)) is small, acceptable damping characteristics are obtained at high frequencies as indicated by the curve [I] in FIG. 11. When the damping factor C1 or C is large, acceptable damping characteristics are obtained at low frequencies including the resonant frequency f0 of the seat cushion 17 as indicated by the curve [II] in FIG. 11. In the embodiment of FIG. 9, acceptable damping characteristics are obtained at frequencies equal to and around the resonant frequency f0 of the seat cushion 17 and also at high frequencies as indicated by the curve [III] in FIG. 11.

DESCRIPTION OF THE SEVENTH PREFERRED EMBODIMENT

Figure 12:
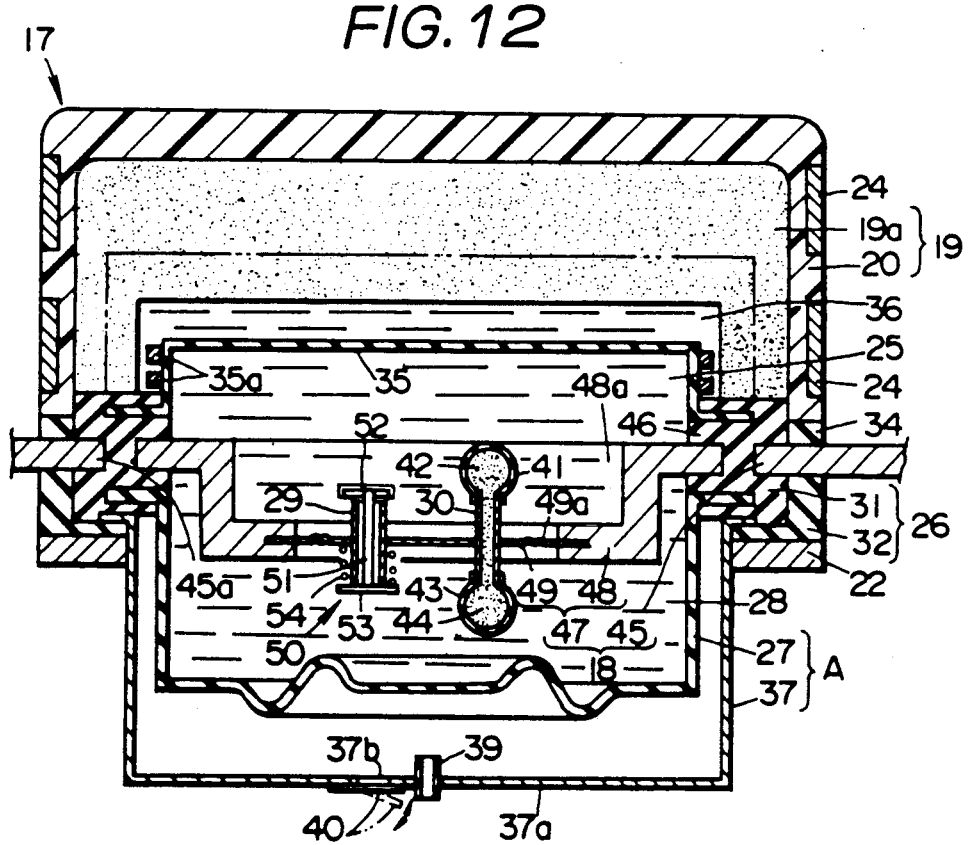
FIG. 12 is a cross-sectional view of a seat cushion according to a seventh embodiment of this invention.

FIG. 12 shows a seventh embodiment of this invention, which is designed in a manner similar to the embodiment of FIG. 9 except for the following design changes.

As shown in FIG. 12, this embodiment includes a valve 50 which selectively blocks and unblocks the orifice through the tube 29. The valve 50 has a rod 51, a valve plate 52, an engagement plate 53, and a tension coil spring 54. The rod 51 movably extends through the orifice in the tube 29. The rod 51 is radially spaced from the tube 29 by a predetermined gap so that liquid can flow through the tube 29. The valve plate 52 is fixed to the end of the rod 51 within the chamber 25. The valve plate 52 selectively blocks and unblocks the orifice through the tube 29. The engagement plate 53 is fixed to the end of the rod 51 within the chamber 28. The coil spring 54 surrounds the tube 29 and is seated between the engagement plate 53 and the inner movable plate 49. The coil spring 54 urges the combination of the engagement plate 53, the rod 51, and the valve plate 52.

Variations of the pressure in the chamber 25 are controlled in accordance with the spring modulus of the coil spring 54. Specifically, the pressure in the chamber 25 during expansion of the chamber 25 is adjusted in accordance with the spring modulus of the spring 54. When the pressure in the chamber 25 varies within a range determined by the force of the spring 54, the orifice in the tube 29 remains open. When the pressure in the chamber 25 exceeds the range, the tube 29 is blocked by the valve 50. In cases where the force k1 of expansion or return of the chamber 25 and the force k2 of the spring 54 are set appropriately, when k1=k2, the valve 50 blocks the orifice in the tube 29. The blocking of the orifice in the tube 29 prevents further expansion of the chamber 25 and thus produces advantageous damping effect.

The other part of this embodiment operates in a way similar to the embodiment of FIG. 9.

What is claimed is:

1. A cushion arrangement comprising:
   a frame;
   a cushioning layer which is connected to the frame;
   a dynamic damper comprising a weight and means for resiliently connecting the weight to the frame;
   means for defining a first chamber between the cushioning layer and the frame which is contractable and expandable in response to movement of the cushioning layer;
   means for defining a contractable and expandable second chamber which is resiliently connected to the frame;
   a liquid which fills the first and second chambers; and
   orifice means for connecting the first and second chambers, the orifice means comprising a first orifice and a second orifice having different effective cross-sectional areas,
   wherein the liquid constitutes the weight.

* * * * *